Jan. 10, 1939.  J. BENZINGER  2,143,431
LOUPE
Filed March 31, 1936
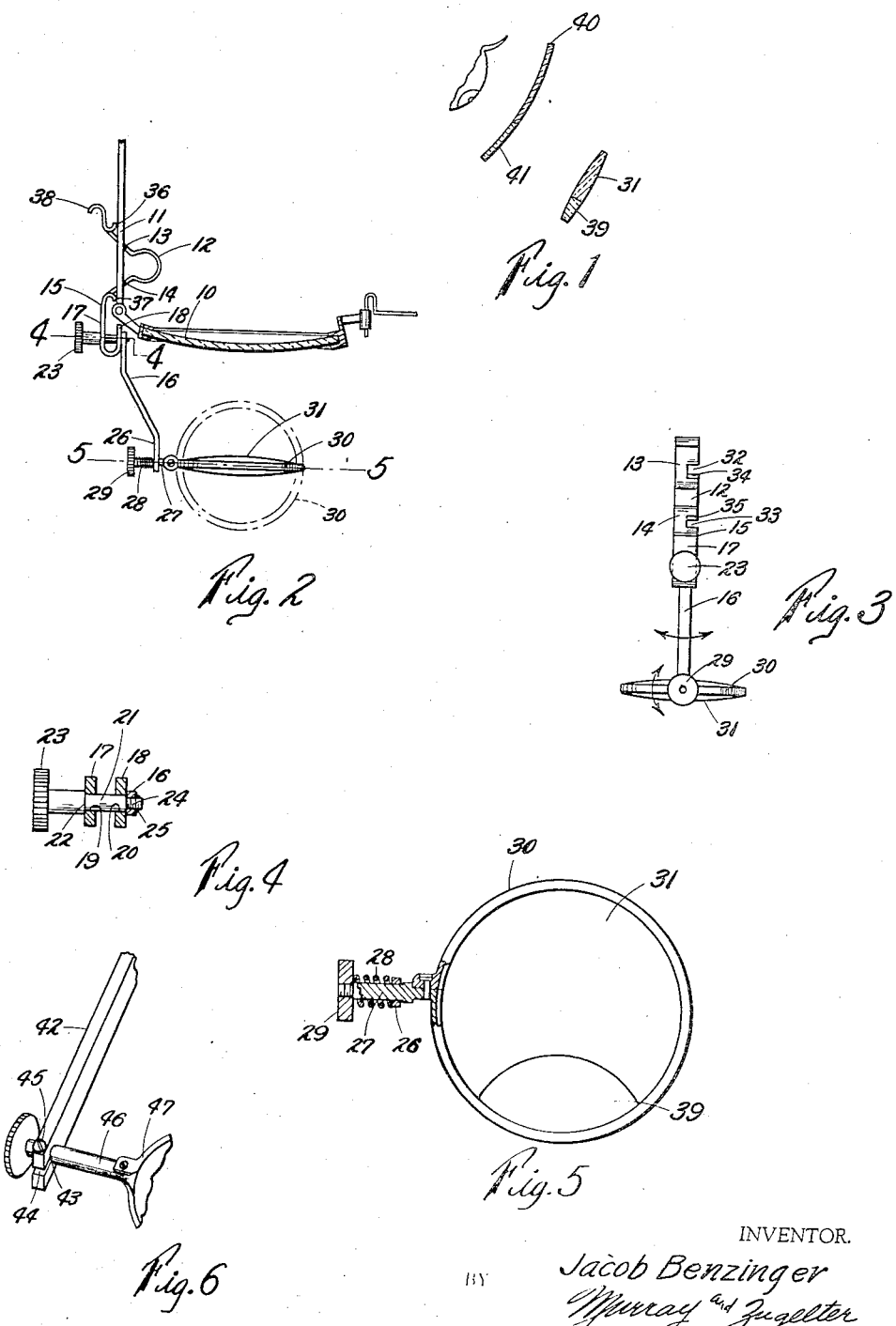
INVENTOR.
Jacob Benzinger
BY
Murray and Zugelter
ATTORNEYS Patented Jan. 10, 1939

2,143,431

UNITED STATES PATENT OFFICE 2,143,431

LOUPE

Jacob Benzinger, Cincinnati, Ohio

Application March 31, 1936, Serial No. 71,919

2 Claims. (Cl. 88—41)

The present invention relates to loupes or magnifiers such as are used by jewelers, watch makers and others in the performance of work upon small details, and has for an object the provision of a device of this kind that is easily attached to the temple of a pair of spectacles, and which is furthermore adaptable for instantaneous adjustment of the magnifying lens to properly align the optical axis of a spectacle lens or a bifocal insert thereof with the optical axis of the magnifier.

Another object of the invention is to provide a loupe of this type so that it may be equipped with either a single power magnifier lens or with a magnifier lens of one power and an insert of higher power, thereby providing a device which may be used for casual magnification and high power magnification, said device being furthermore adapted to perfect alignment for use with either single vision or with bifocal spectacle lenses.

Another object of the invention is to provide a loupe for use with spectacles having temples wherein the optical axis of the magnifier lens is constantly in a plane with the optical axis of the spectacle lens of either single vision or bifocal type, the magnifier lens being capable of raising and lowering relative to the spectacle lens with which it is associated.

Another object of the invention is to provide an arrangement of this kind wherein the magnifier lens is revolubly mounted on a forwardly projecting arm portion, which arm portion is radially adjustable at the outer edge of the spectacle lens when in use, to secure proper elevation.

Another object is to provide a device of this kind that is foldable substantially flatwise in a compact condition, permitting the device to be easily put away in the vest pocket or in a pouch.

Another object of the invention is to provide a device of this kind which embodies a minimum of relatively inexpensive parts in the construction thereof.

These and other objects are attained by the means described herein and disclosed in the accompanying drawing, in which:

Fig. 1 is a diagrammatic side view showing the relation of the eye of the user, a bifocal spectacle lens and a bifocal magnifier lens embodied in the invention.

Fig. 2 is a fragmental plan view of a pair of spectacles having one form of the device of the invention attached thereto.

Fig. 3 is a side view of the device of Fig. 2.

Fig. 4 is a view taken on line 4—4 of Fig. 2.

Fig. 5 is a view taken on line 5—5 of Fig. 2.

Fig. 6 is an enlarged fragmental perspective view showing a modified form of adjustable mounting of the magnifier lens on the device of the invention.

The watch maker's or jeweler's loupe or magnifier of the present invention comprises a one-piece member of flat spring metal which serves as a means to clamp the device upon the temple of a pair of spectacles and also serves as a bearing and frictional adjustment for the lens carrying arm, an arm pivoted on said one-piece clamping member and a magnifier lens mounted in a suitable rim, and said rim having an outwardly extending stud revolubly mounted in and frictionally retained on the free end of the arm. The structure embodies a relationship between the spectacle lens and the magnifier lens such that the horizontal diameters of these lenses may be retained in substantially parallel relation during substantially universal adjustment of the magnifier lens relative to the spectacle lens.

Referring now to the drawing, and particularly to Fig. 2, 10 represents a lens, either single vision or bifocal of an ordinary pair of spectacles and 11, the temple thereof, connected thereto in known manner. The device of the invention consists of a flat spring metal body of unitary construction comprising a suitable body portion 12 from which extend resilient arms 13 and 14. The arm 14 is bent at 15 to provide a pivotally adjustable and frictionally retained mounting for a forwardly projecting lens holding arm 16 which is desirably formed of metal which can be initially bent to a small degree to adapt the loupe to the spectacles with which it is to be used. That portion of the spring metal member beyond the bend 15 is developed into a substantially U-shaped portion comprising legs 17 and 18, these legs having aligned perforations 19 and 20. A pin or stud 21 is revolubly journaled in the bores 19 and 20 and has a shoulder at 22 abutting the outer face of leg 17. A milled or knurled thumb piece 23 is conveniently provided at one end of stud 21 to facilitate turning said stud, while the other end of said stud is made fast to the arm 16 by threaded engagement therewith as at 24, the threaded engagement being supplemented if desired by spreading or riveting the end of the stud as at 25. From the foregoing, it will be readily apparent that when the end of the arm 16 is drawn tightly against the outermost face of leg 18, the resiliency of the metal will provide a frictional holding means for retaining the arm in various positions. The outermost end 26 of arm 16 has a stem 27 revolubly mounted in a transverse bore in said arm, the stem 27 being frictionally retained against free movement by any suitable means such as a coil spring 28 abutting one face of arm 16 and a face of a thumb piece 29 at the end of the stem. Rim 30 has a magnifier lens 31 mounted therein and said rim is fixedly connected to the stem in any suitable manner. As shown in Fig. 5, the stud is made an integral part of the rim 30. From the foregoing, it will be appreciated that the arm 16 may be radially adjusted about the axis of its pivotal mounting on stud 21 through the greater portion of a complete circle. This permits the arm 16 to be folded back over the temple attachment means or to be thrown forwardly thereof in any desired angular relation thereto. The stem 27 is at all times in substantial parallelism with stud 21 and the magnifier lens and associated rim may be revolved on the axis of said latter stem by turning thumb piece 29.

The unitary temple attachment or clamping means is effected by providing in arm 13 a notch 32 and in arm 14 a notch 33, the edges 34 and 35 respectively of said notches being adapted to engage upon one side of the temple piece 11 of a pair of spectacles, while the remaining edges of said notches are developed into tongues 36 and 37 respectively for engaging on the opposite side of the temple 11. A terminal piece or finger engaging member is formed integrally with arm 13 by a simple bend 38 at the end of said arm.

When arms 13 and 14 are unrestrained, notches 32 and 33 diverge sufficiently to throw the notches out of alignment. In attaching the loupe of the invention to the temple of a pair of spectacles, the finger piece 38 and the forward portion of the spring member are pressed together with the thumb and finger until notches 32 and 33 are aligned, whereupon the temple 11 of the spectacles is seated in said notches and the spring arms are released. Thus, the temple is engaged in two places by three walls of each notch and the tendency of the spring arms to further diverge effects a secure clamping of the spring member upon the temple regardless of the cross-sectional shape or size of the temple.

As will be best seen in Fig. 2, the U-shaped portion, or that portion of the spring member extending beyond bend 15, will normally lie ahead of the temple 11 and about opposite the edge of the spectacle lens 10. The user raises and lowers arm 16 by turning the thumb piece 23. When the proper portion of magnifier lens 31 is brought to the desired position relative to the spectacle lens, the thumb piece 29 is used to tilt the magnifier lens to suitable angularity for attaining alignment of the optical axes of the spectacle and magnifier lens with the line of vision. It is to be noted that the stem 27 is disposed above and substantially parallel to the normal horizontal diameter of the magnifier lens. In the larger portion, i. e. that portion shown below the line of the axis of stem 27 in Fig. 5, the lens 31 carries an insert 39 of greater magnifying power.

When the device of the invention is used by a wearer of bifocal spectacles or glasses, the user may adjust the lens 31 so as to adjust the larger field of magnifier 31 with the main vision portion of the bifocal lens 40, or he may adjust the higher power segment 39 with the same portion of the spectacle lens, or in practice, he may use either portion of magnifier with the bifocal segment 41 of the spectacle lenses. The magnifier frame 30 may be turned completely upon its bearing in the arm, so as to place the higher power segment 39 at the top or bottom of the rim according to his position relative to the work.

When the magnifier or loupe is intended to be temporarily placed out of use, the arm 16 may be raised up vertically to bring the magnifier lens above and entirely out of the range of vision of the wearer. If the loupe is to be removed and carried about by the user, the arm 16 is folded entirely back upon the temple clamping member, and the magnifier lens is rotated until it is in a flatwise position with these parts. In this compactly folded form, the device occupies little more space than one ordinary spectacle lens.

A more economical form of mounting of the magnifier lens is shown in Fig. 6 wherein an arm 42 corresponding substantially to arm 16 is transversely perforated at 43 and slit as at 44 from the end of the arm into the perforation. A screw 45 passes through a vertical bore in the arm above slot 44 into a threaded bore in the arm below slot 44, the stem 46 which carries the magnifier lens holding rim 47 being merely passed through bore 43 and clamped sufficiently to avoid accidental turning but to permit rotation of the stem when it is desired to adjust or to fold up the device.

The operation of the device has been described concurrently with the description of its structure. It is to be noted that the optical axis of the magnifier lens 31 and its high power insert 39 may be initially centered with the optical axis of the spectacle lens 10 of the single vision type or the spectacle lens comprising normal vision lens 40 and bifocal insert 41 by imparting an initial bend or adjustment, if necessary, to arm 16. The stud 21 and stem 27 at opposite ends of the arm 16 will be parallel with each other and both will remain in parallelism with the horizontal diameters of the spectacle and magnifier lenses and their inserts, if any. The radial adjustment of arm 16 effects bodily raising and lowering of the magnifier lens on an arc which closely approaches the average curvature of spectacle lenses and the tilting or revoluble adjustment of the magnifier lens on its stem permits the perfect alignment of the optical axis or optical axes in the magnifier lens with the optical axes of the spectacle lens in the proper and correct range of line of vision of the user. The length of the arm 16 is such as to permit raising the magnifier lens upwardly against the forehead and entirely out of the range of vision or downwardly against the cheek at a place that is well beyond the normal line of vision and, when the device is removed from the spectacle temple, the arm 16 may be rocked backwardly against the simple one-piece self-attaching spring clamp in which position the magnifier lens may be tilted flatwise and approximately in the plane of the body 12. The foldable or collapsible feature of the device enables the user to avoid accidental bending of arm 16 and, in many ways, to avoid damage or breakage to the device.

The device is equally effective with spectacles having the temples secured near the top of the lenses and with those secured substantially midway between the top and bottom of the lenses, a condition which cannot be met in a single device amongst those heretofore known and used.

If the radial adjustment of the magnifier is across the field of the spectacle lens measured from the temple, the different locations of temples on the lenses will require different sizes of parts. In the present invention, the optical axis of the magnifier is adjusted vertically instead of arcuately of the vertical center line of the spectacle lens. A bifocal spectacle lens may have perfect adjustment with either the reading insert or the major vision field when the loupe structure of the present invention is used.

What is claimed is:

1. A loupe for use with spectacles having temples and lenses comprising a notched spring clamp for removable attachment to a temple, a resilient U-shaped bend on said clamp, a pivot member parallel to the plane of the spectacle lens and extending horizontally through both sides of the U-shaped bend, an arm fixed on the pivot member and frictionally engaging one side of the U-shaped bend, said arm extending forwardly from said pivot member whereby the arm is self holding in all radial positions of adjustment in a vertical plane at right angles to the face of the spectacle lens and a magnifier supported by the free end of the arm and adjustable about an axis which is a horizontal chord of the magnifier and which axis is parallel to said pivot member whereby the optical axes of the magnifier and spectacle lens are disposed in a common plane in all adjusted positions of adjustment of the arm and of the magnifier.

2. A foldable vest pocket loupe comprising an elongated temple clamp body for attachment to the temple of a pair of spectacles having lenses, an arm frictionally pivoted to said body and arranged to be extended forwardly of the clamp body at any selected angle when in operative position on a pair of spectacles, said arm being foldable to a retracted position wherein the length of the arm and the length of the clamp body are substantially coincident and a magnifier pivoted on and extending transversely of the free end of the arm, the body of the magnifier being adjustable to lie flatwise in substantially a common plane with the arm.

JACOB BENZINGER.